United States Patent
Zhao et al.

(10) Patent No.: US 11,941,509 B2
(45) Date of Patent: Mar. 26, 2024

(54) METHOD AND SYSTEM FOR DETERMINING INFORMATION ON AN EXPECTED TRAJECTORY OF AN OBJECT

(71) Applicant: Aptiv Technologies AG, Schaffhausen (CH)

(72) Inventors: Kun Zhao, Duisburg (DE); Abdallah Alashqar, Wuppertal (DE); Mirko Meuter, Erkrath (DE)

(73) Assignee: Aptiv Technologies AG, Schaffhausen (CH)

( * ) Notice: Subject to any disclaimer, the term of this patent is extended or adjusted under 35 U.S.C. 154(b) by 230 days.

(21) Appl. No.: 17/178,198

(22) Filed: Feb. 17, 2021

(65) Prior Publication Data

US 2021/0271252 A1    Sep. 2, 2021

(30) Foreign Application Priority Data

Feb. 27, 2020  (EP) .................................... 20159899

(51) Int. Cl.
*G06N 20/00* (2019.01)
*G05D 1/00* (2006.01)
(Continued)

(52) U.S. Cl.
CPC ........... *G06N 3/044* (2023.01); *G05D 1/0088* (2013.01); *G05D 1/0219* (2013.01);
(Continued)

(58) Field of Classification Search
CPC .. G05D 1/0088; G05D 1/0219; G05D 1/0221; G05D 1/0223; G05D 2201/0213; G06F 18/251; G06N 3/044; G06N 20/00
See application file for complete search history.

(56) References Cited

U.S. PATENT DOCUMENTS 10,701,394 B1 *   6/2020  Caballero .............. G06N 3/045
2005/0265633 A1 * 12/2005  Piacentino ................ G06T 5/50
                                                                382/265
(Continued)

FOREIGN PATENT DOCUMENTS

CN    111401419       7/2020
DE    102016122190    5/2017
(Continued)

OTHER PUBLICATIONS

"Extended European Search Report", EP Application No. 20187694. 3, dated Dec. 3, 2020, 14 pages.
(Continued)

*Primary Examiner* — Redhwan K Mawari
*Assistant Examiner* — Farhad Dawodi
(74) *Attorney, Agent, or Firm* — Harness, Dickey & Pierce, P.L.C.

(57) ABSTRACT

A method for determining information on an expected trajectory of an object comprises: determining input data being related to the expected trajectory of the object; determining first intermediate data based on the input data using a machine-learning method; determining second intermediate data based on the input data using a model-based method; and determining the information on the expected trajectory of the object based on the first intermediate data and based on the second intermediate data.

20 Claims, 5 Drawing Sheets

(51) Int. Cl.
G06F 18/25 (2023.01)
G06N 3/044 (2023.01)

(52) U.S. Cl.
CPC ......... G05D 1/0221 (2013.01); G05D 1/0223 (2013.01); G06F 18/251 (2023.01); G06N 20/00 (2019.01); *G05D 2201/0213* (2013.01)

(56) References Cited

U.S. PATENT DOCUMENTS

| | | | |
|---|---|---|---|
| 2017/0147888 A1 | 5/2017 | Zeng | |
| 2017/0293837 A1 | 10/2017 | Cosatto et al. | |
| 2018/0032871 A1* | 2/2018 | Holt | G06N 3/045 |
| 2018/0089515 A1 | 3/2018 | Yang et al. | |
| 2018/0120843 A1* | 5/2018 | Berntorp | G06N 3/08 |
| 2018/0232585 A1 | 8/2018 | Kim | |
| 2019/0026597 A1 | 1/2019 | Zeng et al. | |
| 2019/0041835 A1* | 2/2019 | Cella | G06N 3/044 |
| 2019/0049987 A1 | 2/2019 | Djuric et al. | |
| 2019/0065878 A1 | 2/2019 | Zeng et al. | |
| 2019/0147610 A1* | 5/2019 | Frossard | G06N 3/045 382/103 |
| 2019/0161080 A1 | 5/2019 | Gochev et al. | |
| 2019/0171187 A1* | 6/2019 | Cella | G06N 3/126 |
| 2019/0179328 A1 | 6/2019 | Movert et al. | |
| 2019/0382007 A1* | 12/2019 | Casas | G06N 3/045 |
| 2020/0004259 A1* | 1/2020 | Gulino | G06F 18/00 |
| 2020/0019794 A1 | 1/2020 | Engelcke et al. | |
| 2020/0057141 A1 | 2/2020 | Kim | |
| 2020/0090042 A1* | 3/2020 | Wayne | G06N 3/006 |
| 2021/0107532 A1 | 4/2021 | Zhao et al. | |
| 2021/0182077 A1* | 6/2021 | Chen | G06Q 30/0241 |
| 2021/0192347 A1 | 6/2021 | Zhao et al. | |

FOREIGN PATENT DOCUMENTS

| | | |
|---|---|---|
| DE | 102018117777 | 1/2019 |
| DE | 102018120405 | 2/2019 |
| DE | 102017121052 | 3/2019 |
| EP | 1779295 | 5/2007 |
| EP | 2765533 | 8/2014 |
| EP | 2784722 | 10/2014 |
| EP | 3438872 | 2/2019 |
| EP | 3839805 | 6/2021 |
| WO | 2016130719 | 8/2016 |
| WO | 2017177005 | 10/2017 |
| WO | 2018204656 | 11/2018 |

OTHER PUBLICATIONS

Wang, et al., "Robust and Fast Vehicle Turn-counts at Intersections via an Integrated Solution from Detection, Tracking and Trajectory Modeling", Jun. 14, 2020, 9 pages.
Xue, et al., "Pedestrian Tracking and Stereo Matching of Tracklets for Autonomous Vehicles", Apr. 28, 2019, 5 pages.
"Extended European Search Report", EP Application No. 19202631.8, dated Apr. 16, 2020, 12 pages.
"Extended European Search Report", EP Application No. 19219051.0, dated Jul. 23, 2020, 11 pages.
"Extended European Search Report", EP Application No. 20159899.2, dated Sep. 1, 2020, 11 pages.
Alahi, et al., "SocialLSTM: Human Trajectory Prediction in Crowded Spaces", Jun. 2016, 11 pages.
Ba, "Blending Diverse Physical Priors with Neural Networks", Oct. 1, 2019, 15 pages.
Bahram, et al., "A Combined Model- and Learning-Based Framework for Interaction-Aware Maneuver Prediction", Abstract Only, Jan. 7, 2016, 2 pages.
Bansal, "ChauffeurNet: Learning to Drive by Imitating the Best and Synthesizing the Worst", Dec. 7, 2018, 20 pages.
Culurciello, "The fall of RNN / LSTM", Apr. 13, 2018, 10 pages.
Dequaire, et al., "Deep Tracking in the wild: End-to-end tracking using recurrent neural networks", Jun. 22, 2017, pp. 492-512.
Gupta, et al., "Social GAN: Socially Acceptable Trajectories with Generative Adversarial Networks", Mar. 29, 2018, 10 pages.
He, "Deep Residual Learning for Image Recognition", Dec. 10, 2015, 12 pages.
Kerfs, "Models for Pedestrian Trajectory Prediction and Navigation in Dynamic Environments", May 2017, 146 pages.
Lee, et al., "DESIRE: Distant Future Prediction in Dynamic Scenes with Interacting Agents", Apr. 14, 2017, 10 pages.
Lefevre, et al., "A Survey on motion prediction and risk assessment for intelligent vehicles", Jul. 2014, 20 pages.
Li, et al., "Fusion Modeling Method of Car-Following Characteristics", Nov. 2019, 8 pages.
Lin, et al., "Focal Loss for Dense Object Detection", Feb. 7, 2018, 10 pages.
Luo, et al., "Fast and Furious: Real Time End-to-End 3D Detection, Tracking and Motion Forecasting with a Single Convolutional Net", Jun. 2018, pp. 3569-3577.
Makansi, et al., "Overcoming Limitations of Mixture Density Networks: A Sampling and Fitting Framework for Multimodal Future Prediction", Jun. 8, 2020, 18 pages.
Min, et al., "RNN-Based Path Prediction of Obstacle Vehicles With Deep Ensemble", Jul. 23, 2020, 5 pages.
Musicki, et al., "Joint Integrated Probabilistic Data Association— JIPDA", Aug. 2004, pp. 1120-1125.
Park, et al., "Sequence-to-Sequence Prediction of Vehicle Trajectory via LSTM Encoder-Decoder Architecturef", Oct. 22, 2018, pp. 1672-1678.
Particke, et al., "Neural Network Aided Potential Field Approach for Pedestrian Prediction", 101/5/2019, 6 pages.
Sadeghian, et al., "SoPhie: An Attentive GAN for Predicting Paths Compliant to Social and Physical Constraints", Jun. 2018, pp. 1349-1358.
Zernetsch, et al., "Trajectory Prediction of Cyclists using a physical model and an artificial neural network", Jun. 2016, pp. 833-838.
Zhao, "Multi-Agent Tensor Fusion for Contextual Trajectory Prediction", Jul. 28, 2019, 9 pages.
"Foreign Office Action", EP Application No. 20159899.2, dated Feb. 24, 2023, 9 pages.

\* cited by examiner

METHOD AND SYSTEM FOR DETERMINING INFORMATION ON AN EXPECTED TRAJECTORY OF AN OBJECT

CROSS-REFERENCE TO RELATED APPLICATION

This application claims priority to European Patent Application Number 20159899.2, filed Feb. 27, 2020, the disclosure of which is hereby incorporated by reference in its entirety herein.

BACKGROUND

The present disclosure relates to methods and systems for determining information on an expected trajectory of an object.

A human driver of a vehicle considers the surrounding traffic participants to make maneuver decision. The human driver anticipates the future trajectories of the surrounding dynamic objects and the potential risk of collision subconsciously, constantly and instantly. At the same time, the human driver tries to follow the lane, and keep the vehicle in the center of the lane.

For at least partially autonomous vehicles, the vehicle itself is proposed to carry out all this processing, which requires information on the surrounding of the vehicle and of the vehicle itself, and in particular requires information on expected trajectories of various objects.

Accordingly, there is a need to efficiently and reliable determine information on an expected trajectory of an object.

SUMMARY

The present disclosure provides a computer-implemented method, a computer system and a non-transitory computer readable medium according to the independent claims. Embodiments are given in the subclaims, the description and the drawings.

In one aspect, the present disclosure is directed at a computer-implemented method for determining information on an expected trajectory of an object (for example a vehicle or a pedestrian), the method comprising the following steps performed (in other words: carried out) by computer hardware components: determining input data being related to the expected trajectory of the object; determining first intermediate data based on the input data using a machine-learning method; determining second intermediate data based on the input data using a model-based method; and determining the information on the expected trajectory of the object based on the first intermediate data and based on the second intermediate data.

The expected trajectory may be a future expected trajectory, wherein "future" may be understood as to be after the input data. This may be understood as predicting a trajectory in the future.

In another aspect, the expected trajectory may be a past trajectory, which may be understood to be before the input data. This may be understood as reconstructing a trajectory in the past.

In other words, information on an expected trajectory may be determined based on the results of two different methods, one method being a model-based method, and the other method being a machine-learning method. The method provides a fused (fusing the results of the model-based method and the results of the machine-learning method) trajectory prediction method. A corresponding system may also be provided.

Determining the information on the expected trajectory of the object based on the first intermediate data and based on the second intermediate data may be understood as fusing the first intermediate data and the second intermediate data to obtain (directly or after one or more further processing steps) the information on the expected trajectory of the object.

Illustratively, the machine-learning method is not required to learn everything, but only the part that the model-based method (for example of an existing prediction system) does not describe. For example, the interaction with other vehicles cannot easily be modelled, and thus, the aspect of interaction with other vehicles may be learned by the machine-learning method.

For example, if an existing systems uses "velocity x time" to predict the future position, it can obviously not describe the acceleration and breaking of a vehicle movement accurately. Then the machine-learning method may be trained to take into account the acceleration and breaking of the vehicle movement.

With the method according to this aspect, the machine learning approach may be incorporated with known knowledge (i.e. the model-based method) and may improve the performance for long-term trajectory application.

According to another aspect, the input data may be based on sensor data, wherein the sensor data comprising at least one of radar data, lidar data, ultrasound data, mobile radio communication data or camera data. Using those sensors, the previous trajectory of the object may be determined, and the information of the previous trajectory may be used as the input data.

According to another aspect, the input data comprises information related to positions and/or velocities and/or accelerations of the object and/or further objects.

According to another aspect, the information on the expected trajectory of the object is represented by discrete points of time (wherein the actual expected trajectory may be determined based on interpolation between the discrete points) or by a continuous function over time (wherein the actual expected trajectory may be determined based on evaluating the continuous function).

According to another aspect, the information on the expected trajectory of the object is determined based on adding the first intermediate data and the second intermediate data. The first intermediate data and the second intermediate data may be weighted, and the weight may be provided by a trained fusion network. The weight may be fixed, or may be dependent on the first intermediate data and/or the second intermediate data.

It will be understood that any network referred to herein may be a neural network or any other suitable kind of network for determining output data based on input data.

According to another aspect, the information on the expected trajectory of the object may be determined using a fusion network based on the first intermediate data and based on the second intermediate data. The fusion network may be a neural network, and may be trained to combine the first intermediate data and the second intermediate data to provide the expected trajectory.

According to another aspect, the fusion network comprises a plurality of learnable parameters. For example, the fusion network may be a neural network, and the learnable parameters may be weights of a neural network.

According to another aspect, the fusion network comprises a weighted sum. The weights used in the weighted sum may be constant or may be learned from the first intermediate data and/or the second intermediate data (for example using a neural network).

According to another aspect, the information on the expected trajectory of the object is determined based on adding the first intermediate data and the second intermediate data.

According to another aspect, the machine-learning method comprises a first encoding network. According to another aspect, the model-based method comprises a second encoding network.

According to another aspect, first decoded intermediate data may be determined based on the first intermediate data using a first decoding network, wherein the information on the expected trajectory of the object is determined further based on the first decoded intermediate data. According to another aspect, second decoded intermediate data may be determined based on the second intermediate data using a second decoding network, wherein the information on the expected trajectory of the object is determined further based on the second decoded intermediate data.

According to another aspect, the first intermediate data is determined using a first encoding network, the second intermediate data is determined using a second encoding network, and the information on the expected trajectory is determined using a fusion network based on the first intermediate data and the second intermediate data. In other words, the fusion may be carried out in the latent space (as will be described in more detail below), and the first and second intermediate data are the encoding outputs.

According to another aspect, the first intermediate data is determined using a first encoding network and a first decoding network, the second intermediate data is determined using a second encoding network and a second decoding network, and the information on the expected trajectory is determined using a fusion network based on the first intermediate data and the second intermediate data. In other words, the fusion may be carried out in the physical space (as will be described in more detail below), and the first and second intermediate data are the decoding outputs.

In another aspect, the present disclosure is directed at a computer system, said computer system comprising a plurality of computer hardware components configured to carry out several or all steps of the computer-implemented method described herein.

The computer system may comprise a plurality of computer hardware components (for example a processing unit, at least one memory unit and at least one non-transitory data storage). It will be understood that further computer hardware components may be provided and used for carrying out steps of the computer-implemented method in the computer system. The non-transitory data storage and/or the memory unit may comprise a computer program for instructing the computer to perform several or all steps or aspects of the computer-implemented method described herein, for example using the processing unit and the at least one memory unit.

In another aspect, the present disclosure is directed at a vehicle comprising the computer system as described above.

In another aspect, the vehicle further comprises at least one sensor configured to acquire sensor data, wherein the computer system is configured to determine the input data based on the acquired sensor data.

In another aspect, the present disclosure is directed at a non-transitory computer readable medium comprising instructions for carrying out several or all steps or aspects of the computer-implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer-implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
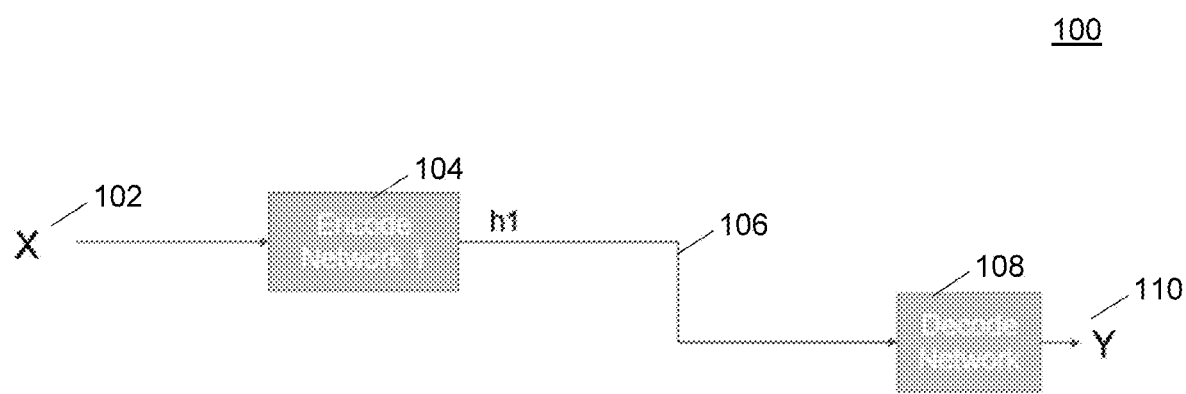
FIG. 1 an illustration of a machine learning based approach.

FIG. 1 shows an illustration 100 of a machine learning based approach. An input X 102, which may include measurement features of the target trajectory, and possibly also its neighboring vehicles' trajectories, may be provided to an encode network 104. The measurements may for example be information on current positions and velocities. The encode network 104 may be a neural network (NN), for example a RNN (recurrent neural network)-based network. For example, the approach described in European Patent Application 19202631.8, which is incorporated herein by reference in its entirety, may be used as the encode network 104. The output of this network 106 (which may also be referred to as h1) may be a code in the latent space (in other words: hidden space), describing the complete past dynamic of the target, and possibly also its interaction with surrounding vehicles.

With the latent code 106, the decode network 108 may decode it into the given form of the predicted future trajectory Y 110. In an example, five points may be predicted for a five second long future trajectory, with one second interval among them.

A past trajectory of an object may be described with multiple points at consecutive time frames. Each point may consist of, but is not restricted to, features (such as for example position, velocities, acceleration, heading angles) to describe the state of the object at specific past time frames.

According to various embodiments, given the past trajectory of the target object, and possibly also its surrounding objects' trajectories, the future trajectory of the target may be predicted, which may be similarly represented by multiple points at multiple future time frames, or which may be described in a continuous way, such as the method described in European Patent Application 19219051.0, which is incorporated herein by reference in its entirety.

Figure 2:
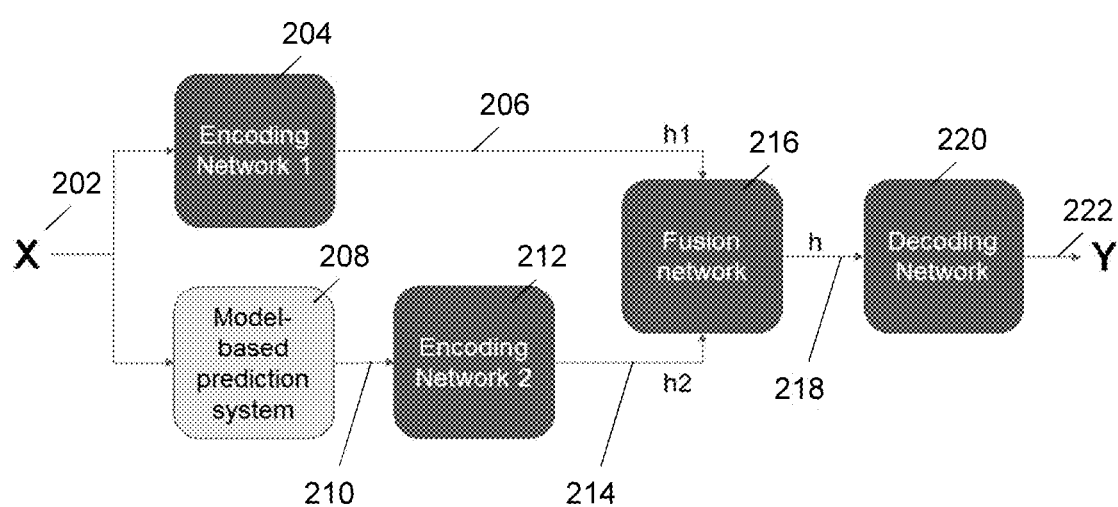
FIG. 2 an illustration of an extended system according to various embodiments.

FIG. 2 shows an illustration 200 of an extended system according to various embodiments, which extends the pure machine-learning based network of FIG. 1.

X 202 may be the input, for example system trajectory input (in other words: the past trajectory). Y 222 may be the predicted future trajectory. The first encoding network 204 and the first latent code 206 (h1) may be similar or identical to the encode network 104 and latent code 106 of FIG. 1. The first latent code 206 may be first intermediate data.

The model-based prediction system 208 may output model-based results 210, which may be used as input to a second encoding network 212. The second encoding network 212 may output a second latent code 214. The second latent code 214 may be second intermediate data. The second encoding network 212 may be used to encode the output 210 of the model-based prediction (which, for example, may include or may be the future trajectory points) into a latent code, so that the fusion may be carried out in the latent space.

The fusion network 216 may be a network with learnable (in other words: trainable or optimizable) parameters, and may output a fused code 218 (h) based on the first latent code 206 (h1) and the second latent code 214 (h2). For example, the fusion network 216 may determine the fused code 218 according to the following equation:

$$h=f(W1*h1+W2*h2+b),$$

wherein f may be a function, for example an activation function, and W1 and W2 may be trainable weights. The fused code 218 may be provided to a decoder network 220 to decode the final trajectory.

The trajectory data may be a time series data, and the encoding and decoding networks may be implemented using RNNs, for example long short-term memory (LSTM) and/or gated recurrent unit (GRU). However, it will be understood that instead of an RNN, any other type of network may be used for encoding or decoding, for example a convolutional neural network (CNN) may be used.

The input data X 202 may, for example, include the past trajectory point position(s), the measured velocity or velocities and/or acceleration(s) in longitudinal and/or lateral directions. These data may be provided in the vehicle coordinate system. Furthermore, the input data X may include the ego vehicle's own velocity and/or yaw rate.

The latent code, as its name suggests, may not have a specific physical meaning. The latent code may be the output of an encoding network, and this output does not really have physical meaning, so that this output may be considered as a latent code. The latent code may be considered similar to an encrypted code.

The model-based results 210 may include data representing the positions of the predicted trajectory points, for example x and y positions. In various embodiments, the predicted trajectory points may have more variables than just positions, for example, it can also include the velocities and/or accelerations.

The model-based prediction system 208 may include a computational, physics-based model for prediction of movement or a trajectory, and may be based on physical laws or may be tracking-based.

For example, there are physical laws restricting and describing the movement of an object. Theoretically one can use the physical laws to predict the movement of any moving objects.

As a simplified example, given speed v, acceleration a, the driven distance s after t seconds can be calculated using:

$$s=v*t+0.5*a*t^2$$

This physical law is correct, but taking only this physical law may not work properly for prediction of moving objects due to the underlying assumption of the velocity v and acceleration a being kept constant (i.e. the same) for the time period of t (for example t seconds), and this assumption may not be valid or feasible for a relative long period of t, which is the case for long-term trajectory prediction. If it is desired to predict the position for the next e.g. 0.05 second of a vehicle, the above physical law may hold well. A vehicle cannot change its movement just instantly, so for a 0.05 second future prediction, the assumption can still be feasible. But for the autonomous driving applications, a long-term prediction for a few seconds is needed, for example to help anticipates the possible danger, and/or to help planning the ego path.

A human driver may react to a sudden emergency quite fast and hit the break in less than half second, so such a simple physical law based approach obviously may not be used for autonomous driving applications.

As such, a more advanced physical law based approach may be used for the model-based method according to various embodiments. For example, the movement may be decomposed into longitudinal and lateral direction and the x and y components may be predicted separately, using velocity and acceleration. If more information are provided, so not only velocity and acceleration but also e.g. jerk, turning rate, pitch angle, etc. the model-based prediction may be further refined. The real world driving condition may deviate from what is described by the above equation.

In the object tracking area, the Kalman filter based approaches for state estimation may be used. For example, such approaches may be used for radar applications.

A tracking system may incorporate a system model, which describes the movement of an object, e.g. with complicated physical modeling, with various parameters. The tracker may estimate these parameters given the measurement it gets.

Furthermore, techniques like Multiple Model (MM), for example Interacting Multiple Model (IMM), may provide the possibility of incorporating multiple different system models into a tracking system. Such trackers may estimate the possibilities of all the models together with their corresponding parameters.

As a simplified example, a vehicle tracking system may have the following models: the vehicle is driving straight forward with constant acceleration (constant velocity is a special case that acceleration is constantly 0). The vehicle is turning with constant yaw movement. Then the tracking system may estimate the possibilities of each of the models and see which one is most likely happening at current time frame. Such IMM based tracking system may respond to a maneuver more quickly and may thus provide good performance in real world applications.

Such a system may be used also for prediction, since it has multiple models and their possibility, it can give better prediction.

According to European Patent Application 19202631.8, which is incorporated herein by reference in its entirety, three key factors may be categorized for long-term trajectory prediction: past trajectory, dynamic context, and static context.

The factor of "past trajectory", namely how to model and estimate the movement more accurately, may be considered. According to various embodiments, for a long-term future trajectory, also the interaction with the surrounding dynamic and static context may be considered.

The physical laws to describe the movement may not be wrong, just the assumption they use may be not be valid for all situations. According to various embodiments, the knowledge of the models involving physical laws may be used, and a machine-learning method may be trained to compensate for the invalidity of the physical model at certain situations.

According to various embodiments, the machine-learning based approach may be combined with any exist prediction system: at one hand, the data driven approach may be incorporated into the problem, avoid explicit modeling. The movement of an object may still be modeled per physical laws, but other factor of the context may not (easily) be done in that way. Thus, a machine-learning approach according to various embodiments to approximate the underlying rather complex interaction with context may be used.

On the other hand, the known knowledge from any existing system may be brought into the machine-learning approach.

According to various embodiments, integration of any existing system (for example model-based method) with a machine learning based approach for trajectory prediction may be provided. Regardless of how simple or complicated the existing system is, the machine learning base approach (for example the (neural) network) may help to improve the trajectory prediction results.

Returning to FIG. 2, the processing path "X→encoder network 1→h1→fusion network" may integrate any machine learning system. For example, a system that learns the interaction among the target and its surrounding vehicles (for example as described in European Patent Application 19202631.8, which is incorporated herein by reference in its entirety), or a system learns the interaction of the target with the static driving environment.

The process path "X2→encode network 2→h2→fusion" may bring known knowledge into the machine learning approach, for example using the model-based prediction system 208. The overall network does not need to learn everything from data completely.

Figure 3:
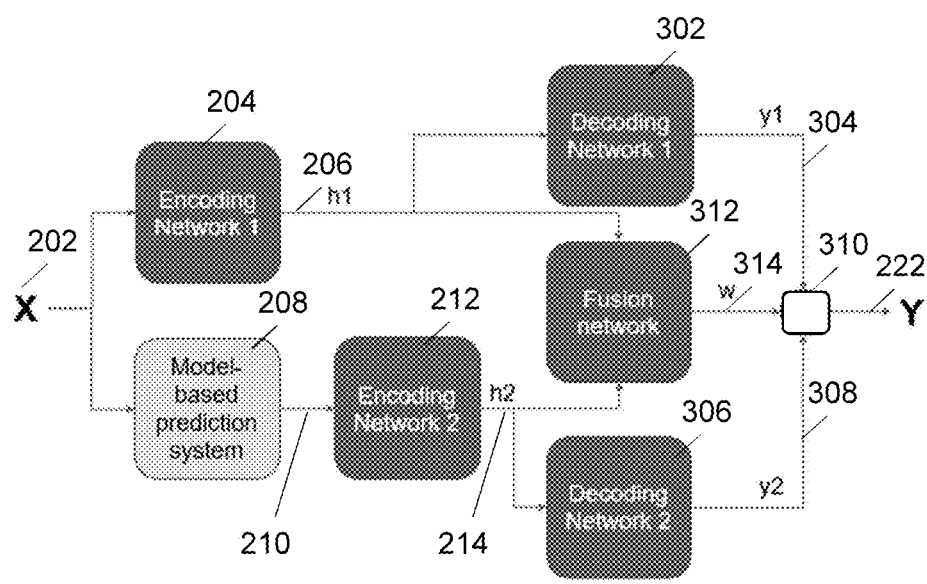
FIG. 3 an illustration of a system according to various embodiments with an alternative arrangement to the arrangement shown in FIG. 2.

FIG. 3 shows an illustration 300 of a system according to various embodiments with an alternative arrangement to the arrangement shown in FIG. 2. For example, a first decoding network 302 may provide a first portion 304 (y1) of the predicted future trajectory 222, based on the first latent code 206, and a second decoding network 306 may provide a second portion 308 (y2) of the predicted future trajectory 222, based on the second latent code 214. The predicted future trajectory 222 may be a weighted sum 310 of the first portion 304 and the second portion (which corresponds to the model-based results 210), so that: y=w*y1+(1−w)*y2, wherein the weight w 314 of the weighted addition may be learned by the fusion network 312.

When comparing FIG. 2 and FIG. 3, it can be seen that the first latent code 206 and the second latent code 214 are generated the same way. A difference lies in how the first and second latent codes 206, 214 are combined and finally decoded into the final result Y (222).

In the embodiment illustrated in FIG. 2, fusion is carried out in the latent space, i.e. the fusion network 216 is directly combining the first latent codes 206 and the second latent code 214 into one latent code h (218). Decoding of the latent code h (218) is carried out afterwards, using the decoding network 220. In the embodiment illustrated in FIG. 2, the first intermediate data may be the first latent code 206, and the second intermediate data may be the second latent code 214.

In the embodiments illustrated in FIG. 3, fusion is carried out in the physical space, i.e. the predicted trajectories y1 (304) and y2 (308) are combined per weighted sum (instead of their latent codes as in FIG. 2). The weight w (218) for adding may be learned from the first and second latent codes 206, 214. In the embodiment illustrated in FIG. 2, the first intermediate data may be the first portion of the predicted future trajectory y1 (304), and the second intermediate data may be the second portion of the predicted future trajectory y2 (308).

According to various embodiments, the second decoding network 306 may not be present, and the model-based results 210 may be used instead of the predicted trajectory y2 (308).

Figure 4:
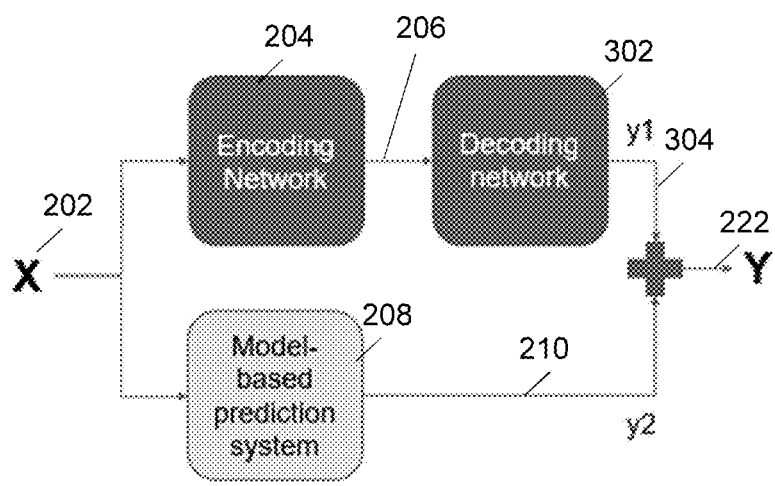
FIG. 4 an illustration of a system according to various embodiments with an alternative arrangement to the arrangement shown in FIG. 2.

FIG. 4 shows an illustration 400 of a system according to various embodiments with an alternative arrangement to the arrangement shown in FIG. 2, wherein the fusion may be an "add" (addition) operation. Given the input, the network gives the prediction 304 (y1), and this is directly added to the model-based prediction 208. This may intuitively be understood as the network making corrections to the model-based predictions.

The embodiment illustrated in FIG. 4 may be considered as a special case of the embodiment illustrated in FIG. 3, where the weight w has a constant value of "1". Thus, the second encoding network 212, the second decoding network 306, and the fusion network 312 for generating the weight w 314 may not be needed any more.

Thus, the main difference between the embodiments illustrated in FIG. 2 and FIG. 3 or FIG. 4 is where the fusion is carried out (either in the latent space by fusing the latent codes, or in the physical space by decoding the codes first and adding them together afterwards).

Figure 5:
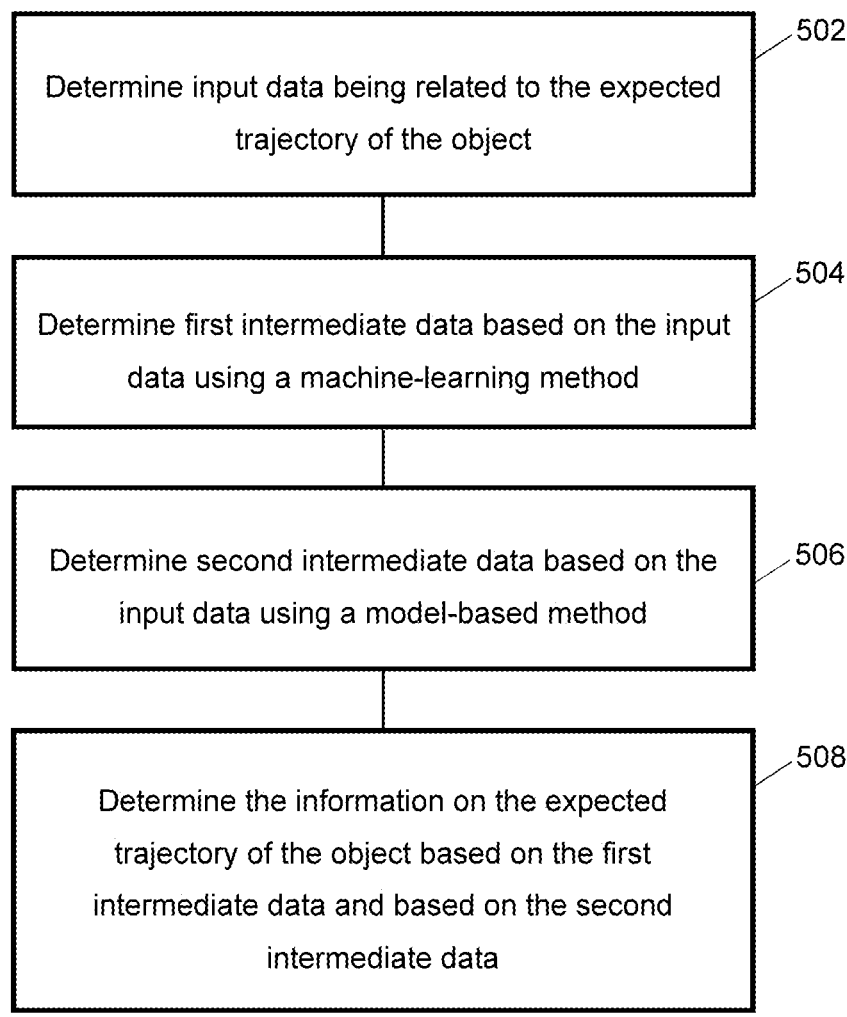
FIG. 5 a flow diagram illustrating a method for determining information on an expected trajectory of an object according to various embodiments.

FIG. 5 shows a flow diagram 500 illustrating a method for determining information on an expected trajectory of an object according to various embodiments. In 502, input data being related to the expected trajectory of the object may be determined. In 504, first intermediate data may be determined based on the input data using a machine-learning method. In 506, second intermediate data may be determined based on the input data using a model-based method. In 508, the information on the expected trajectory of the object may be determined based on the first intermediate data and based on the second intermediate data.

According to various embodiments, the input data may be based on sensor data, the sensor data comprising at least one of radar data, lidar data, ultrasound data, mobile radio communication data or camera data.

According to various embodiments, the input data may include or may be information related to positions and/or velocities and/or accelerations of the object and/or further objects.

According to various embodiments, the information on the expected trajectory of the object may be represented by discrete points of time or by a continuous function over time.

According to various embodiments, the information on the expected trajectory of the object may be determined based on adding the first intermediate data and the second intermediate data.

According to various embodiments, the information on the expected trajectory of the object may be determined using a fusion network based on the first intermediate data and based on the second intermediate data.

According to various embodiments, wherein the fusion network may include a plurality of learnable parameters.

According to various embodiments, the fusion network comprises a weighted sum (in other words: a weighted sum is used in (or as) the fusion network).

According to various embodiments, the information on the expected trajectory of the object is determined based on adding the first intermediate data and the second intermediate data.

According to various embodiments, the machine-learning method may include or may be a first encoding network.

According to various embodiments, the model-based method may include a second encoding network.

According to various embodiments, the first intermediate data may be determined using a first encoding network, the second intermediate data may be determined using a second encoding network, and the information on the expected trajectory may be determined using a fusion network based on the first intermediate data and the second intermediate data.

According to various embodiments, the first intermediate data may be determined using a first encoding network and a first decoding network, the second intermediate data may be determined using a second encoding network and a second decoding network, and the information on the expected trajectory may be determined using a fusion network based on the first intermediate data and the second intermediate data.

According to various embodiments, the method may further include determining first decoded intermediate data based on the first intermediate data using a first decoding network, wherein the information on the expected trajectory of the object may be determined further based on the first decoded intermediate data.

According to various embodiments, the method may further include determining second decoded intermediate data based on the second intermediate data using a second decoding network, wherein the information on the expected trajectory of the object may be determined further based on the second decoded intermediate data.

Each of the steps 502, 504, 506, 508 and the further steps described above may be performed by computer hardware components.

What is claimed is:

1. A computer-implemented method, the method comprising:
   determining, by computer hardware components, information on an expected trajectory of an object by at least:
   determining input data related to the expected trajectory of the object;
   determining, based on the input data and using a first encoding network, a first latent code corresponding to the expected trajectory of the object;
   determining, based on the input data and using a method based on physical laws, results corresponding to the expected trajectory of the object;
   determining, based on the results and using a second encoding network, a second latent code corresponding to the expected trajectory of the object;
   fusing, using a fusion network, the first latent code and the second latent code to create a fused latent code or a weight;
   determining the expected trajectory by:
   decoding the fused latent code: or
   decoding the first latent code and the second latent code; and
   combining the decoded first latent code and the decoded second latent code using the weight; and
   operating a vehicle in at least a partially autonomous mode based on the expected trajectory.

2. The computer-implemented method of claim 1, wherein the first encoding network is part of a machine-learned method.

3. The computer-implemented method of claim 1, wherein the input data is based on sensor data, the sensor data comprising at least one of radar data, lidar data, ultrasound data, mobile radio communication data, or camera data.

4. The computer-implemented method of claim 1, wherein the input data comprises information related to positions or velocities or accelerations of the object or further objects.

5. A system, the system comprising:
   a computer system comprising a plurality of computer hardware components configured to:
   determine information on an expected trajectory of an object by at least:
   determining input data related to the expected trajectory of the object;
   determining, based on the input data and using a first encoding network, a first latent code corresponding to the expected trajectory of the object;
   determining, based on the input data and using a method based on physical laws, results corresponding to the expected trajectory of the object;
   determining, based on the results and using a second encoding network, a second latent code corresponding to the expected trajectory of the object;
   fusing, using a fusion network, the first latent code and the second latent code to create a fused latent code or weight;
   determining the expected trajectory by:
   decoding the fused latent code; or
   decoding the first latent code and the second latent code; and
   combining the decoded first latent code and the decoded second latent code using the weight; and
   operating a vehicle in at least a partially autonomous mode based on the expected trajectory.

6. The system of claim 5, further comprising:
   a vehicle comprising the computer system.

7. The system of claim 6,
   wherein the vehicle further comprises at least one sensor configured to acquire sensor data; and
   wherein the computer system is configured to determine the input data based on the acquired sensor data.

8. A non-transitory computer readable medium comprising instructions, that when executed, configure computer hardware components to:
   determine information on an expected trajectory of an object by at least:
   determining input data related to the expected trajectory of the object;
   determining, based on the input data and using a first encoding network, a first latent code corresponding to the expected trajectory of the object;
   determining, based on the input data and using a method based on physical laws, results corresponding to the expected trajectory of the object;

determining, based on the results and using a second encoding network, a second latent code corresponding to the expected trajectory of the object;

fusing, using a fusion network, the first latent code and the second latent code to create a fused latent code or a weight;

determining the expected trajectory by:
    decoding the fused latent code; or
    decoding the first latent code and the second latent code; and
    combining the decoded first latent code and the decoded second latent code using the weight; and operating a vehicle in at least a partially autonomous mode based on the expected trajectory.

9. The computer-implemented method of claim 1,
wherein:
    the fusing comprises fusing the first latent code and the second latent code to create the fused latent code; and
    the determining the expected trajectory comprises decoding the fused latent code.

10. The computer-implemented method of claim 9, wherein the fusion network comprises learnable parameters.

11. The computer-implemented method of claim 1,
wherein:
    the fusing comprises fusing the first latent code and the second latent code to create the weight; and
    the determining the expected trajectory comprises:
        decoding the first latent code and the second latent code; and
        combining the decoded first latent code and the decoded second latent code using the weight.

12. The computer-implemented method of claim 11, wherein the combining comprises a weighted sum.

13. The computer-implemented method of claim 11,
wherein:
    the decoded first latent code comprises a first portion of the expected trajectory; and
    the decoded second latent code comprises a second portion of the expected trajectory.

14. The system of claim 5,
wherein:
    the fusing comprises fusing the first latent code and the second latent code to create the fused latent code; and
    the determining the expected trajectory comprises decoding the fused latent code.

15. The system of claim 14,
wherein the fusion network comprises learnable parameters.

16. The system of claim 5,
wherein:
    the fusing comprises fusing the first latent code and the second latent code to create the weight; and
    the determining the expected trajectory comprises:
        decoding the first latent code and the second latent code; and
        combining the decoded first latent code and the decoded second latent code using the weight.

17. The system of claim 16,
wherein the combining comprises a weighted sum.

18. The system of claim 16,
wherein:
    the decoded first latent code comprises a first portion of the expected trajectory; and
    the decoded second latent code comprises a second portion of the expected trajectory.

19. The non-transitory computer readable medium of claim 8,
wherein:
    the fusing comprises fusing the first latent code and the second latent code to create the fused latent code; and
    the determining the expected trajectory comprises decoding the fused latent code.

20. The non-transitory computer readable medium of claim 8,
wherein:
    the fusing comprises fusing the first latent code and the second latent code to create the weight; and
    the determining the expected trajectory comprises:
        decoding the first latent code and the second latent code; and
        combining the decoded first latent code and the decoded second latent code using the weight.

\* \* \* \* \*